United States Patent
Garcia et al.

[15] 3,700,817

[45] Oct. 24, 1972

[54] SINGLE CHANNEL CARRIER TELEPHONE SYSTEM

[72] Inventors: Julian Garcia; James C. Carroll, both of Raleigh, N.C.

[73] Assignee: International Telephone and Telegraph Corporation

[22] Filed: Oct. 16, 1970

[21] Appl. No.: 81,506

Related U.S. Application Data

[63] Continuation-in-part of Ser. No. 700,784, Jan. 26, 1968, abandoned.

[52] U.S. Cl. ....................179/2.5 R

[51] Int. Cl. ....................H04h 1/04

[58] Field of Search........179/2.5, 41 A, 84 R, 15 FD

[56] References Cited

UNITED STATES PATENTS

| | | | |
|---|---|---|---|
| 3,501,591 | 3/1970 | Krasin | 179/2.5 |
| 3,510,584 | 5/1970 | Krasin | 179/2.5 |
| 2,932,694 | 4/1960 | Hawks | 179/15 |
| 2,763,726 | 9/1956 | Weller | 179/84 |
| 2,516,763 | 7/1950 | Edson | 179/2.5 |

*Primary Examiner*—William C. Cooper
*Assistant Examiner*—Thomas D'Amico
*Attorney*—C. Cornell Remsen, Jr., Rayson P. Morris, Percy P. Lantzy, J. Warren Whitesel and Delbert P. Warner

[57] ABSTRACT

The described system provides a single channel carrier system for doubling the capacity of existing subscriber lines and PBX lines. Systems of this type have been made before, but they have generally failed for a number of reasons ranging from their inability to cope with variations in line impedances to microphonics and position sensitivity of telephone transmitters. The invention provides circuits which overcome these and other "bugs."

8 Claims, 3 Drawing Figures

INVENTORS
JULIAN GARCIA
JAMES C. CARROLL
BY [signature]
ATTORNEY

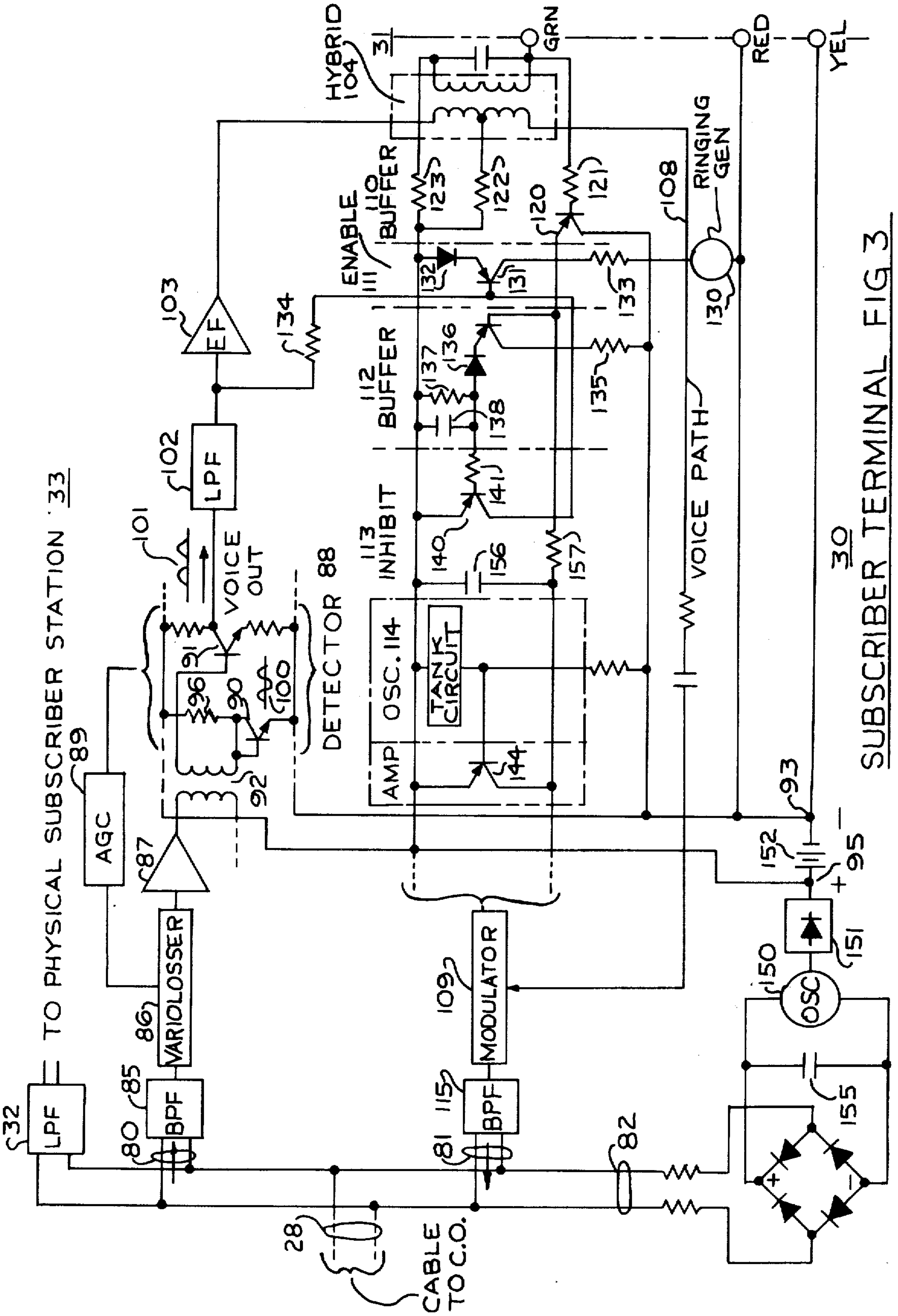
30 SUBSCRIBER TERMINAL FIG 3

SINGLE CHANNEL CARRIER TELEPHONE SYSTEM

This application is a continuation of application Ser. No. 700,784 which was filed Jan. 26, 1968 and which is now abandoned.

BACKGROUND OF THE INVENTION

This invention relates to carrier telephone systems and more particularly to systems for adding a single carrier channel to a telephone line extending from a central office to a subscriber station or PBX.

Since the beginnings of telephony, wire and other lines have been used to connect subscriber stations or private branch exchanges to some kind of central communication facilities. For present purposes, it is irrelevant whether these facilities are central office switches, concentrators, or any other well known devices. The point is that a great number of lines are required, and that the total number of lines quickly tends to become a factor limiting further growth of the system. For example, there is a limit to the number of lines which can be carried by telephone poles, underground conduits, connected to cable heads, and the like.

Recently, carrier equipment has been used to solve the problems of providing increasing amounts of service without increasing the number of lines that are required. In greater detail, this type of carrier equipment adds a single carrier channel to each line leading to a subscriber station or a PBX. This way, one subscriber may continue using the physical line as in the past, and another totally different subscriber may use the added carrier channel which is superimposed upon the line — thus doubling the transmission capacity.

When efforts were made to add extra channels in this manner, there were many problems. First, subscriber station equipments are the most numerous equipments in the entire system. Any additional cost at this point is multiplied by the number of stations requiring such equipments. Second, the characteristics of subscriber lines tend to be the most unpredictable and non-uniform characteristics in the entire system. Third, the new carrier equipment must be entirely compatible with all equipment which might be in existence at the time when the single channel is added. This means, for example, that ringing current must be used, voice currents must be acceptable, and signals must reliably operate suitable equipment, both at the central office and at the subscriber stations. For example, dial pulses must be the standard 10 IPS--40 percent "make 60 percent" break--or else the controlled switching network will not function. Moreover, the dial pulses must not cause a bell to ring even if the equipment must also reliably enable the bell to be rung by currents falling within the same relative frequency ranges. Fourth, the equipment must be entirely safe — devoid of dangerous potentials — when mounted on the subscriber's premises. Still other features and characteristics will readily occur to those who are skilled in the art.

SUMMARY OF THE INVENTION

Accordingly, an object of the invention is to provide new and improved single channel carrier systems. Here, an object is to provide equipment which may be added to existing lines with no resulting loss in efficiencies or false operations. Yet another object is to provide carrier equipment which can operate efficiently over subscriber lines having a great variety of different line impedances. Still another object is to provide such systems without allowing any dangerous voltages to be present at the subscribers premises. A further object of the invention is to accomplish all of the foregoing objects at a minimum cost.

In keeping with an aspect of the invention, these and other objects are accomplished by means of a single channel carrier system for providing an additional private voice channel on an existing pair of wires. The invention "de-bugs" previous systems by overcoming problems inherent in the variegated line impedances which are regularly encountered in telephone systems and by providing superior supervision signaling and controls.

BRIEF DESCRIPTION OF THE DRAWINGS

The nature of an exemplary embodiment of the invention for accomplishing these and other objects will become apparent from a study of the attached drawings in which.

DESCRIPTION OF THE PREFERRED EMBODIMENT

Certain terms are used herein to identify the various parts of the circuits and system; however, such usage is not to be construed as unduly limiting the invention thereto. For example, the conventional subscriber line is called the "physical" line, and the equipment associated therewith is also identified by the prefix word "physical." The carrier channel equipment is called an "added" line, and likewise, the equipment associated therewith is also identified by the prefix word "added". Of course, the system uses "phycical" equipment for both lines and either line could be the one which is "added." Thus no greater emphasis is to be given to this word selection.

Figures 1, 2, 3:
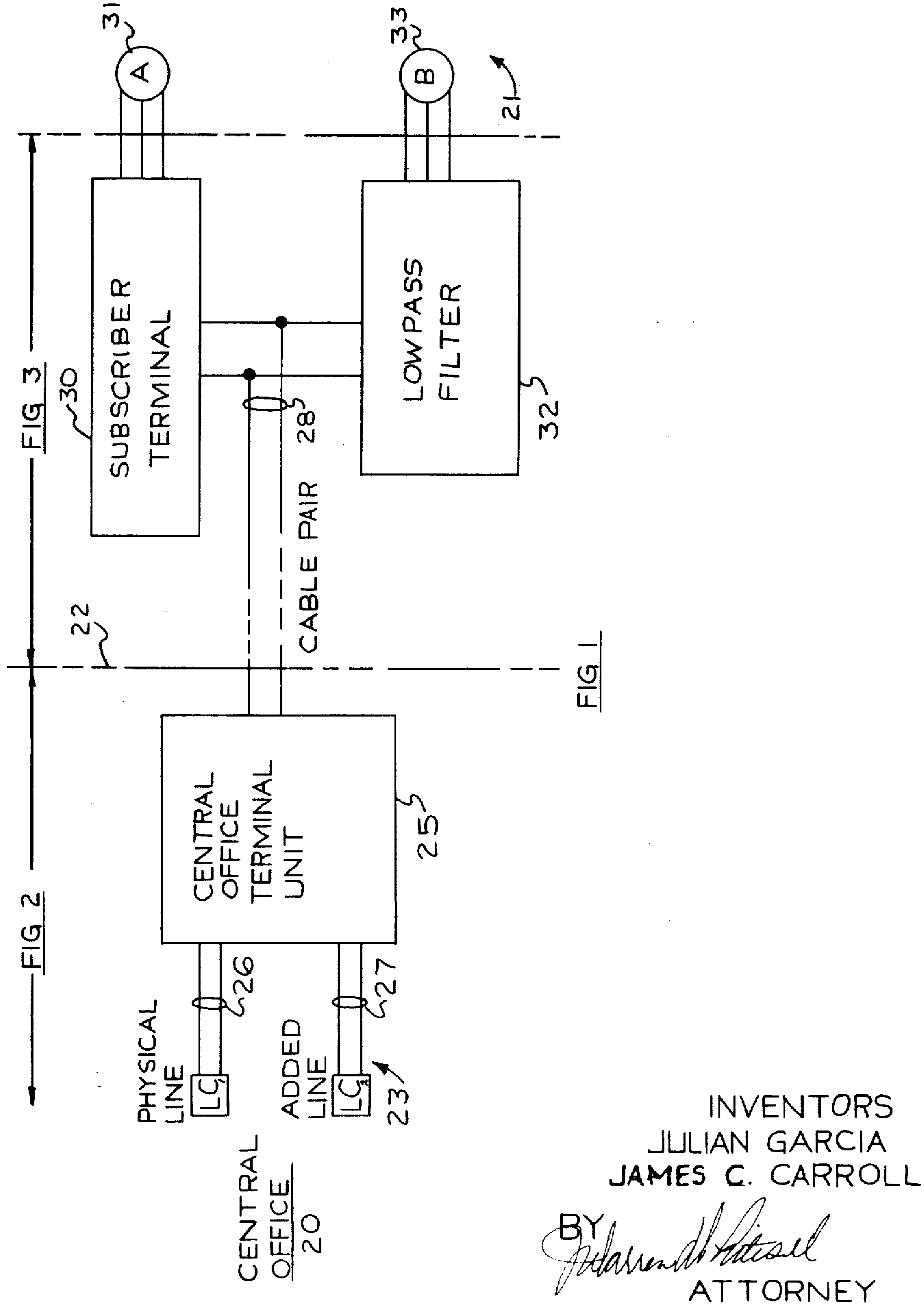
FIG. 1 is a block diagram showing a preferred embodiment of a single channel carrier system incorporating the features of the invention.
FIG. 2 is partly a block diagram and partly a schematic circuit diagram showing the inventive aspects of a central office terminal unit incorporating principles of the invention.
FIG. 3 is partly a block diagram and partly a schematic circuit diagram showing the inventive aspects of a subscriber terminal incorporating the principles of the invention.
Figure 2:
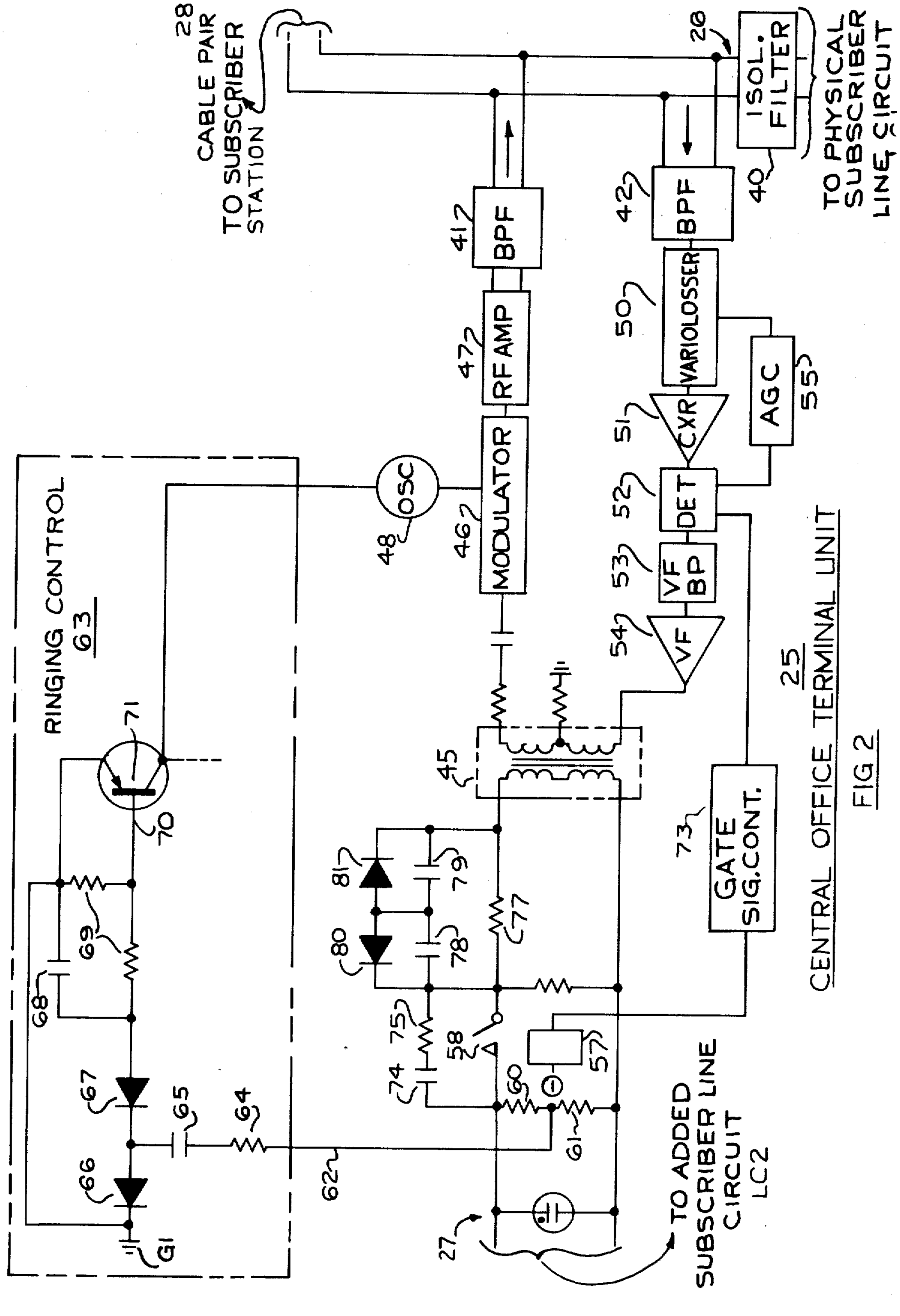

FIG. 1 shows a block diagram of a double sideband, amplitude modulated single channel carrier system. The central office 20 is shown at the left, and the subscriber stations 21 are shown at the right of intermittently dashed line 22. Conventionally, the central office includes a number of line circuits 23—usually one such circuit for each subscriber line. Normally, the subscriber line runs from an individually associated line circuit to the subscriber's premises.

According to existing single channel carrier system design, two of the line circuits are connected to a central office terminal unit 25. These two line circuits 23 are here shown as being connected to terminal unit 25 via any suitable lines 26, 27. The other side of the terminal unit 25 is connected to a line 28 leading to the subscriber's premises. This line may be any known and convenient form, such as an open wire line, an underground cable, or the like. However, it is here assumed to be a non-loaded exchange cable; therefore, it is herein called a "cable pair." The distant end of the cable pair 28 is connected through a subscriber terminal 30 to the added line station 31 and through a low pass isolation filter 32 to the physical line and its associated station 33.

Thus, the physical line may be traced from a conventional line circuit LC1, over wires 26, through the central office terminal unit 25, cable pair 28, and isolation filter 32 to the physical line subscriber station 33. The added line may be traced from another conventional line circuit LC2, over wires 27, through the central office terminal unit 25, cable pair 28, and subscriber terminal 30, to the added line station 31. Each of these two circuits (the physical and added circuits) should normally function in its own conventional manner totally unaffected by the existence of the other circuit. The entire unit is powered from the central office battery. However, a local battery is trickle charged during all intervals while such charging will not interfere with telephone services.

There are many advantages to be derived from a system such as this. For example, no special knowledge or skills are required for the installation or maintenance of the system. Simply make connections 26, 27 from conventional line circuits 23 to the unit 25. Connect the cable pair 28. Add elements 30, 32 on the appropriate subscriber's premises, and connect telephones 31, 33 which are entirely conventional. No adjustments are required unless the cable pair 28 has some unforeseen characteristic, in which case suitable compensation may be provided. Equipment is added only as and when it is required. Entirely conventional equipment may be used everywhere except for the central office terminal unit 25, subscriber terminal 30, and filter 32.

FIG. 2 shows the equipment required to complete the central office terminal unit 25. The physical line circuit LC1 connects to the wires 26 at the lower righthand corner of FIG. 2. The added line circuit LC2 connects to the wires 27 on the left side of FIG. 2. The cable pair 28 connects to the right-center of FIG. 2.

The separation between the physical and added subscriber circuits is accomplished by an isolation (or lowpass) filter 40 which is interposed in the line 26 for passing the conventional band of VF telephone signals. A bandpass filter 41 passes outgoing signals of the proper sideband frequencies from the line circuit LC2 to the cable pair 28. Another bandpass filter 42 passes incoming signals of the proper sideband frequencies from the cable pair 28 to the added line circuit LC2.

The outgoing channel may be traced from a hybrid circuit 45 through a modulator 46, an RF amplifier 47, and the bandpass filter 41 to the cable pair 28. An oscillator 48 supplies the appropriate carrier frequency to the modulator. The incoming channel includes the bandpass filter 42, a variolosser 50, a carrier frequency amplifier 51, a detector 52, a voice frequency bandpass filter 53, a voice frequency amplifier 54, and the hybrid circuit 45. A suitable automatic gain control 55 circuit is connected between the detector and varilosser 50. All of these elements operate in a conventional manner.

The remaining elements in FIG. 2 relate to the ringing and signal control equipments. Normally carrier is suppressed and only the sidebands are sent. The ringing control circuit 63 is designed to turn on the carrier oscillator 48 and thereby send out an uninterrupted carrier signal over cable pair 28 whenever conventional ringing current is transmitted from any source into the added line circuit LC2. If the ringing current is interrupted in any manner, the carrier current is also interrupted in the same manner. The signaling circuit operates responsive to incoming carrier current which represents either on-hook or off-hook signals or dial pulses sent over the cable pair 28 from the added subscriber station 31. As the carrier frequency comes in, the relay 57 operates to send a corresponding closed loop, hook switch signal or dial pulse by closing the contacts 58.

In greater detail, ringing current is sent into the central office terminal unit 25 by any conventional equipment transmitting in any conventional manner over the line 27. Regardless of whether the ringing current is sent over either side of the line or over both lines simultaneously, the current is transmitted through one or both of the resistors 60, 61 and then over the wire 62 to the ringing control circuit 63. The resistor 64 limits current, and the capacitor 65 tends to smooth and integrate the received ringing current. The diodes 66, 67 rectify the ringing current. The capacitor 68 and its damping resistors 69 further smooth the ripple out of the rectified ringing current. Thus, the control voltage appears on the wire 70 and at the base of transistor 71 whenever ringing current appears at the added line circuit LC2. Moreover, owing to the various capacitive delays, the signal on wire 70 persists longer than the half-cycles of the ringing current. Thus, the PNP transistor 71, acting as an electronic D.C. switch, is switched on and off by interruptions in the ringing current; it does not, however, follow the individual cycle alternations of the ringing current, per se. Each time that the transistor 71 turns on, a ground potential G1 is applied to the oscillator 48. This potential turns on the oscillator and thereby sends a carrier frequency out over the cable pair 28.

The oscillator 48 should be completely isolated from the central office terminal unit receive channel (signalling circuit channel) 50–55. For example, sometimes there is a reason for using a common oscillator 48 for both the modulation and demodulation. In other cases, it is conventional to provide common power supply points of standard voltages which are used to power all components. In a similar prior art single channel carrier system, this use of common points in the send and receive channels resulted in a cross-modulation of bias potentials supplied to the variolosser 50, the oscillator 48, and modulator 46. When this cross-modulation occurs, the normal carrier current is fed to the distant end and then back through the system to indicate a false signaling to the end which is actually doing the signaling, as when the ringing control circuit 63 turns on the oscillator 48. With the automatic gain control action of circuit 55, the feedback signal sometimes sets the level that is stabilized, and it—not the incoming voice signal—assumed pre-eminance in the various pieces of voice transmission equipment.

Hence, an advantage of the inventive ringing control circuit should now be apparent. This circuit is well adapted to separate the carrier current which is sent and received over cable pair 28.

Dial pulses are received, over line 28, at the central office terminal unit 25. The added telephone station 31 sends these pulses in the form of interrupted bursts of carrier current. Each of these bursts is detected at 52 in any conventional way. The resulting signal controls a gate circuit 73. The output of the gate 73, energizes and operates the pulsing relay 57. In this way, the loop to the line circuit LC2 is opened and closed at contacts 58 to repeat the dial pulses as they are received from the added subscriber station 31. The capacitor 74 and resistor 75 provide spark protection for the pulsing contacts 58.

A frequency equalization circuit compensates for unequal frequency losses on the line 27. In greater detail, a standard telephone office supplies approximately 48-volts to the hybrid circuit 45. Considering the requirements of the various circuit components and the need to balance the hybrid circuit 45, it is necessary to limit these 48-volts to some lower voltage level. Thus, a current limiting and voltage dropping resistor 77 is included in series with the hybrid circuit 45. But, in this circuit, the attenuation of this resistor tends to have a more pronounced effect upon lower frequencies than upon the higher ones. To avoid the resulting attenuated roll off in amplitude of low frequencies, the resistor 77 is bypassed by two fairly large and equal capacitors 78, 79. The diodes 80, 81 are shunted across the corresponding ones of these capacitors 78, 79 to selectively switch one or the other of the capacitors 78, 79 into (or out of) the circuit—depending upon whether the instantaneous voltage is then swinging in a positive or a negative direction.

At the subscriber station end (FIG. 3), of the cable pair 28, there is a low pass filter 32 which is designed to pass all frequencies in the conventional telephone voice band. Thus, the physical subscriber station 33 may transmit and receive as in the past, totally unaffected by the presence of the carrier channel.

The added subscriber station 31 is connected by its conventional green, red, and yellow wires to similarly marked terminals on the right-hand side of the drawing. The station 31 receives over the voice channel connected to the cable pair 28 at 80 and transmits to the cable pair over the voice channel connected at 81. The entire voice subscriber terminal 30 is powered by the central office battery which drives a d.c. to d.c. converter 150 connected at 82. The output of this converter trickle charges a nickel-cadium battery.

The receive channel includes a bandpass filter 85 tuned to pass the pertinent sideband frequencies. The output of the filter 85 is applied through a variolosser 86 to a carrier frequency amplifier 87, and a detector 88. An automatic gain control is provided, in any known manner by a suitable circuit 89.

To provide temperature stability, the detector 88 includes two matched transistors 90, 91 which are coupled to an amplifier 87 by means of a repeat coil 92. The base bias for the transistor 91 is supplied over a path which may be traced from a negative battery terminal 93 through the emitter-base junction of the transistor 90 and the right-hand winding of coil 92 to the base of the transistor 91, and which may also be traced from the positive battery terminal 95 through the resistor 96, and the right-hand winding of the coil 92 to the base of the transistor 91. The two transistors 90, 91 are virtually identical; therefore, any temperature-variation-caused voltage changes which may occur across the internal base-emitter junctions are the same for both of the transistors 90, 91. As these voltage changes tend to go up or down at the transistor 91, there is an exactly equal change at the transistor 90. The circuit wiring is arranged so that these changes compensate each other and restore stability. A result is that the detector 88 may be made to respond to a very critical threshold in the voice signal voltages. The instant when the input signal 100 crosses a reference voltage line, the output of the small signal amplifying transistor 91 begins to provide a corresponding output signal 101. This output signal is sent through a low pass filter 102 and an emitter follower coupling circuit 103 to an input branch of a hybrid circuit 104. The hybrid output in this case is applied to the added telephone station 31.

The transmit channel includes a first path (108, 109) for sending the voice signals and a second path (110 – 114) for sending dial pulses and hook switch control signals from the added station 31 to the control signals cable pair 28.

The voice signal path may take any conventional form extending from the hybrid circuit 104 to the modulator 109, and after modulation to the cable pair 28 via a band pass filter 115 which is tuned to pass the pertinent side band.

The signal dial pulse and control signal path of the transmit channel includes, in cascade, a buffer stage 110, an enable stage 111, a buffer stage 112, an inhibit stage 113, and the carrier frequency oscillator 114.

The buffer stage 110 is an electronic switch that turns on and off to repeat dial pulses and hook switch control signals. This circuit is necessary to provide an interface between the mechanical telephone parts and the electronic logic. In greater detail, a conventional telephone transmitter capsule includes carbon particles which fall under the force of gravity to the bottom of a chamber. Therefore, the transmitter capsule displays a slightly different resistance depending upon the position in which the chamber is held. The electronic logic elements used in a prior art system are so very sensitive that this resistive difference is detected, amplified, and sometimes sent out as a signal. In fact, the problem has been so severe in the prior art system that an entire train of dial pulses could be simulated by the simple expedient of waving the transmitter in the air while the d.c. transmitter path is closed through associated hook-switch contacts. In this prior art system, the current providing the d.c. power for the entire terminal 30 is sent through over a circuit traced from the negative battery terminal 93 over the "yellow" wire, through the telephone transmitter (not shown) and returned to the "green" wire, and on to the electronic logic circuit. This same d.c. path is interrupted by the dial contacts so that both the transmitter noise and dial pulses are essentially interruptions in the same loop current.

According to the invention, the DC transmitter path is limited to relatively low current levels which are adequate for speech and loop dialing. An electronic switch 120, in the form of a PNP transistor, is switched on and off by opening and closing the loop at the added subscriber station 31 to thereby apply or remove a potential at the transistor base. When the electronic switch 120 is closed, (i.e. transistor 120 is turned on) the relatively heavy current required to power terminal 30 flows from the negative battery terminal 93 and through the transistor 120 to the electronic logic circuits 110–114. In this way, the transmitter current can be held to such low levels that there are no significant variations in the IR drop across the transmitter responsive to the variations in the transmitter positions. The coupling resistor 121 provides an isolation between the base of the transistor 120 and the "green" wire. The resistor 122 balances the hybrid coil 104. The resistor 123 limits current into the hybrid coil.

The ringing generator 130 is a multivibrator or an oscillator adapted to supply current (such as 16 cps) for ringing the bell at the added subscribers telephone station 31. Whenever the generator 130 is turned on, ringing current is fed out over the "red" wire to the associated ringer (not shown). It is essential that this generator come on immediately, when ringing current is received over the cable pair 28 from the central office. Otherwise, the ringing current is likely to end before the ringer overcomes its mechanical inertia—and the ringing becomes marginally unreliable. This is especially true in countries where ringing current is sent out in short (say, 0.2 second) bursts.

In keeping with the invention, the enable circuit 111 is used for controlling the ringing generator. This circuit is entirely free of reactive elements (such as capacitors) which might tend to slow the ringing response.

In greater detail, this control is accomplished by an electronic switch 131 which turns on the ringing generator 130. The enable circuit 111 includes a PNP transistor 131 which is used as the electronic switch. The emitter-base of transistor 131 is protected against reverse voltage transients and is provided with temperature stabilization means by way of diode 132. The function of the switch 131 output is to apply a signal through a coupling resistor 133 to the ringing generator 130.

When ringing current is required, the transistor 131 is turned on by a signal applied from the receive channel 80 through a coupling resistor 134 to the base electrode of transistor 131.

If the central office terminal 25 sends carrier current over the cable pair 28, such a control signal is sent through the resistor 134 to turn on the transistor 131 and thereby trigger the ringing generator.

The carrier current is interrupted at the desired ringing interruption rate. Therefore, the ringing current generator 130 is also turned on and off at the same rate, and interrupted ringing current is sent over the "red" wire to telephone station 31.

Buffer 112 prevents dialing current from being reflected to cause local ringing. As will become apparent, dial pulses are sent from the subscriber terminal 30 to the central office terminal 25 in the form of bursts of carrier current. The central office terminal 25 sends interrupted ringing signals to terminal 30 via bursts of the same carrier current. The dial signal carrier current could be reflected from the receive channel to the send channel in the central office terminal 25. This reflection would then cause bursts of carrier current to return to the subscriber terminal 30. However, the buffer 112 disables the ringing generator enable circuit 111 so that local ringing can not be keyed if the local station 31 is off-hook.

In greater detail, the buffer 112 includes a current limiting resistor 135, an emitter-base "junction protecting" diode 136, and an emitter bias resistor 137. A capacitor 138 and the resistor 137 form an RC timing circuit.

The capacitor 138 is connected in a very fast charging and a very slow discharging RC timing circuit. This timing arrangement speeds an inhibition, which is applied to stop the ringing otherwise possible in response to the reflections of the dial pulses of carrier current, and it delays the turn off time long enough to cause the ringing control circuit 111 to follow the bursts of incoming carrier signal and not to follow the individual half cycles of the carrier current.

The inhibit circuit 113 is the gate which actually disables the ringing control circuit 111. It includes a PNP transistor 140 used as an electronic switch. The base of transistor 140 is coupled to the buffer stage 112 via a resistor 141 which provides an interstage coupling.

When the subscriber station goes off hook for any reason, a loop is closed from negative battery 93 through the "yellow" wire to the subscriber station 31, and a closed set of hook switch contacts (not shown) to the "green" wire and the base of the transistor 120. The transistor 120 turns on and applies a negative battery potential to the base of the transistor in the buffer circuit 112. That transistor turns on and applies a similar negative potential through resistor 135, diode 136, and resistor 141 to turn on the inhibit transistor 140. This transistor applies a positive potential to the base of the transistor 131, thereby holding it latched in an off condition. If the transistor 131 can not turn on, the ringing current generator can not send ringing current to the added line station 31.

Another effect of the loop closure is the transmission of carrier current as a seizure signal to the central office. In greater detail, when the transistor 120 turns on, a negative potential is applied to the collector of a transistor 144 in the oscillator circuit 114. This causes the oscillator to turn on and transmit carrier current to the central office.

During dialing, the loop across the "yellow" and "-green" wires is opened and closed a number of times according to the value of the digit dialed. Each time that the loop opens, the transistor 120 turns off; each time that it closes the transistor 120 turns on. When the transistor 120 turns off, its collector potential is removed from the collector of transistor 144. That transistor must then turn off and thereby terminate the transmission of carrier current from terminal 30 over pair 28 to terminal 25. This way, the central office may detect the value of the dialed digit by monitoring the interruptions of the carrier current.

The power supply circuit includes a d.c. to d.c. converter 150 which interrupts the d.c. battery potential sent from the central office. This interruption enables a use of conventional a.c. power handling techniques in order to change the voltages, as required. After a proper voltage is reached, it is rectified at 151 and used to trickle charge the battery 152. The battery is then used to power the components shown elsewhere in FIG. 3.

In the prior art circuits of the described types, these d.c. to d.c. converters have sometimes caused and encountered problems. For example, the variegations in the impedances of the cable pair 82 have caused the incoming potentials to vary. As a result, the potentials applied to the circuit 150 vary greatly, and the output frequency also tends to vary greatly. One result is that the output frequencies have tended to be fed back as an erratic noise which may cause a great variety of unexpected results, as well as unpleasant sounds.

Another problem has already been alluded to. The transmitter tends to have different impedance values responsive to variations in the transmitter positions.

To overcome these and other problems, the invention provides several very large decoupling capacitors 155 and 156. The capacitor 155 tends to reduce any rapid frequency variations caused by inconsistant line voltage. In addition, a resistor 157 sets an RC timing period which tends to further damp any voltage variation which may remain despite the best efforts to control the d.c. to d.c. converter.

While the invention is described above in connection with a preferred embodiment, it is to be understood that the invention is not necessarily limited thereto. Quite the contrary, the invention is to be construed broadly enough to cover all equivalents reasonably falling within the true scope and spirit of the invention.

We claim:

1. A single channel carrier system for telephone lines, said system comprising a central office terminal unit and a subscriber terminal unit interconnected to said central office terminal unit, a pair of telephone stations connected to said subscriber terminal unit, line circuits corresponding to each of said stations, low pass filter means for connecting one of said line circuits and the corresponding one of said telephone stations into said system as a physical circuit, band-pass filter means for connecting the other of said line circuits and the corresponding telephone station into said system as an added circuit, means in said subscriber terminal unit for suppressing or transmitting carrier frequencies to control the ringing and signalling between said terminal units, means in said subscriber terminal unit for precluding ringing at said stations responsive to carrier frequencies used for signalling and for precluding signalling responsive to carrier frequencies used for ringing to said station, means at said central office terminal unit for generating carrier currents interrupted at ringing current interruption rates, means at said subscriber terminal unit operated responsive to said interrupted carrier currents for generating ringing current for transmission to said other station, and means at said subscriber terminal unit for disabling said ringing current generating means responsive to an off-hook condition at said other telephone station, and timing means responsive to an off-hook condition at said other station and having fast and slow response characteristics, means responsive to said fast response characteristics for quickly operating said means for precluding said false ringing signal, and means responsive to said slow response characteristic for preventing said ringing current generating means from falling into synchronism with the half cycles of said carrier wave form.

2. The system according to claim 1 wherein said central office terminal unit includes a send channel and receive channel, hybrid means for coupling a subscriber line circuit to said send and receive channels, carrier current generating means in said send channel, means effectively isolating said send channel from said receive channel, means interposed between said line circuit and said hybrid means for detecting ringing current, and means responsive to a detection of said ringing current for operating said carrier current generating means to transmit carrier frequency through said send channel.

3. The system according to claim 4 further including frequency equalization means interposed between said ringing current detection means and said hybrid means.

4. The system according to claim 3 wherein said equalization means comprises a pair of capacitors connected in series, said series being connected in parallel with a resistor, and a series connected pair of oppositely poled diodes, one of said diodes being connected in parallel with one of said capacitors, and the other of said diodes being connected in parallel with the other of said capacitors.

5. The system according to claim 1 wherein said terminal unit includes hybrid circuit means for interconnecting a send channel, a receive channel and a telephone station, means responsive to the receipt of carrier frequency signals in said receive channel for sending locally generated ringing current to said telephone station, means responsive to the receipt of closed loop signals from said telephone station for transmitting said carrier frequencies through said send channels and for disabling said local ringing means.

6. The system according to claim 5 further including means for sending low level d.c. power through said telephone station, and gate buffer means operated responsive to said closed loop conditions for applying power to energize said terminal unit.

7. The system according to claim 5 further including local power supply means comprising dc to dc converter means for dropping d.c. power received at said terminal unit, said dropping frequency being subject to change responsive to variations in the levels of said received d.c. power, and at least one decoupling capacitor connected across said d.c. to d.c. converter to reduce said variations in said power.

8. The system according to claim 5 further including detector means in said receive channel, said detector means comprising a pair of matched transistors, means for applying signals appearing in said receive channels to the base of one of said transistors, means for applying d.c. bias potentials at least partially through the base-emitter junction of the other of said transistors to the base of said one transistor whereby the same emitter-base junctions experience the same environmental caused voltage variations, said d.c. bias varying to compensate for such environmental caused variations.

* * * * *